(12) United States Patent
Wang et al.

(10) Patent No.: US 9,605,737 B2
(45) Date of Patent: Mar. 28, 2017

(54) IMPELLER SHELL WITH GROOVES FOR INCREASED FLOW AREA

(71) Applicant: Schaeffler Technologies GmbH & Co. KG, Herzogenaurach (DE)

(72) Inventors: Kunding Wang, Copley, OH (US); Larry Chad Boigegrain, Copley, OH (US); Srinath Sistla, Wooster, OH (US); Matthew Smith, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 352 days.

(21) Appl. No.: 14/518,077

(22) Filed: Oct. 20, 2014

(65) Prior Publication Data

US 2015/0107235 A1    Apr. 23, 2015

Related U.S. Application Data

(60) Provisional application No. 61/894,794, filed on Oct. 23, 2013.

(51) Int. Cl.
| | | |
|---|---|---|
| *F16D 31/00* | (2006.01) | |
| *F16H 41/26* | (2006.01) | |
| *F16H 41/28* | (2006.01) | |
| *F16H 41/24* | (2006.01) | |

(52) U.S. Cl.
CPC ............ *F16H 41/26* (2013.01); *F16H 41/28* (2013.01); *F16H 2041/243* (2013.01); *Y10T 29/49321* (2015.01)

(58) Field of Classification Search
CPC .... F16H 41/26; F16H 41/28; F16H 2031/243; Y10T 29/49321
USPC .......................................................... 60/364
See application file for complete search history.

(56) References Cited

U.S. PATENT DOCUMENTS 8,042,330 B2    10/2011    Wiegert et al.

*Primary Examiner* — Thomas E Lazo
*Assistant Examiner* — Daniel Collins
(74) *Attorney, Agent, or Firm* — Davidson, Davidson & Kappel, LLC

(57) ABSTRACT

An impeller for a motor vehicle torque converter is provided. The impeller includes an impeller shell including blade supporting portions and fluid flow receiving portions between the blade supporting portions, the blade supporting portions being thicker than the fluid flow receiving portions; and a plurality of impeller blades, each of the impeller blades being connected to one of the blade supporting portions at an inner surface of the impeller shell. A method for forming an impeller of a torque converter is also provided.

13 Claims, 3 Drawing Sheets

IMPELLER SHELL WITH GROOVES FOR INCREASED FLOW AREA

This claims the benefit to U.S. Provisional Patent Application No. 61/894,794, filed on Oct. 23, 2013, which is hereby incorporated by reference herein.

The present disclosure relates generally to torque converters and more specifically to impellers of torque converters.

BACKGROUND

U.S. Pat. No. 8,042,330 discloses an impeller shell including a groove for receiving turbine blades without brazing.

SUMMARY OF THE INVENTION

An impeller for a motor vehicle torque converter is provided. The impeller includes an impeller shell including blade supporting portions and fluid flow receiving portions between the blade supporting portions, the blade supporting portions being thicker than the fluid flow receiving portions; and a plurality of impeller blades, each of the impeller blades being connected to one of the blade supporting portions at an inner surface of the impeller shell.

A method for forming an impeller of a torque converter is also provided. The method includes thinning a plurality of sections of a rounded blade receiving portion of an impeller shell so as to leave a plurality of unthinned sections between the thinned sections; and attaching impeller blades to the unthinned sections.

BRIEF DESCRIPTION OF THE DRAWINGS

The present invention is described below by reference to the following drawings, in which.

DETAILED DESCRIPTION

The present disclosure provides an impeller shell with thickened blade mounting "plateaus" with thinned "canyons" therebetween for increased flow area. Because the impeller shell thickness is selected based mostly on stress in areas outside of the rounded blade receiving portions of conventional impellers, the shell is unnecessarily thick at the rounded blade receiving portions between the blades. By thinning that portion, the flow area is increased and performance improved.

Figure 1:
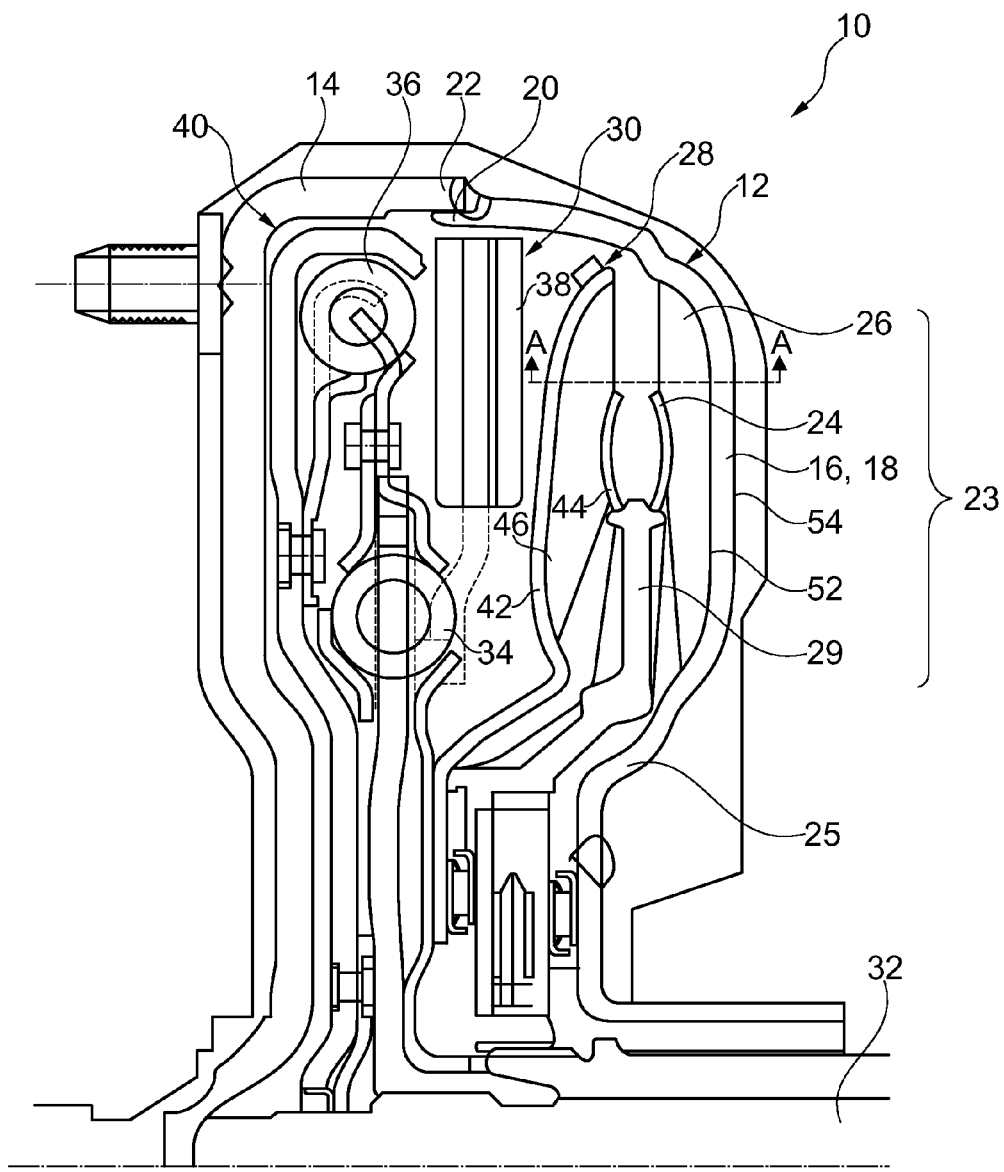
FIG. 1 shows a torque converter including an impeller in accordance with an embodiment of the present invention.

FIG. 1 shows a torque converter 10 including an impeller 12 in accordance with an embodiment of the present invention. Torque converter 10 includes a front cover 14 for connecting with a crankshaft of a motor vehicle engine and a rear cover 16 forming a shell 18 of impeller 12. Front cover 14 and rear cover 16 are both substantially cup shaped and are joined by providing an axial extension 20 of rear cover 16 radially inside of an axial extension 22 of front cover 14. Impeller shell 18 includes a rounded blade receiving portion 23 and a radial extension 25 extending radial inward from the rounded portion. Rounded blade receiving portion 23 and an inner ring 24 of impeller 12 support a plurality of impeller blades 26 therebetween. Torque converter 10 also includes a turbine 28 opposite of impeller 12 and a stator 29 positioned between impeller 12 and turbine 28. A damper 30 is positioned between front cover 14 and turbine 28 for transferring torque from turbine 28 to a shaft 32, which may be coupled to a drive component, for example a variable-speed transmission. Damper 30 includes a radially inner set of springs 34, a radially outer set of springs 36 and a centrifugal pendulum absorber 38.

A lock-up clutch 40 is provided between damper 30 and front cover 14 for rotationally connecting turbine 28 and front cover 14 together, via damper 30, when impeller 12 and turbine 28 have the same rotational velocity. Turbine 28 is formed by a turbine shell 42 and an inner ring 44 supporting a plurality of turbine blades 46 therebetween. As turbine 28 is driven by impeller 12, either through engagement of lock-up clutch 40 or through fluid flow between blades 26, 46, turbine 28 transfers torque to damper 30.

Figure 2:
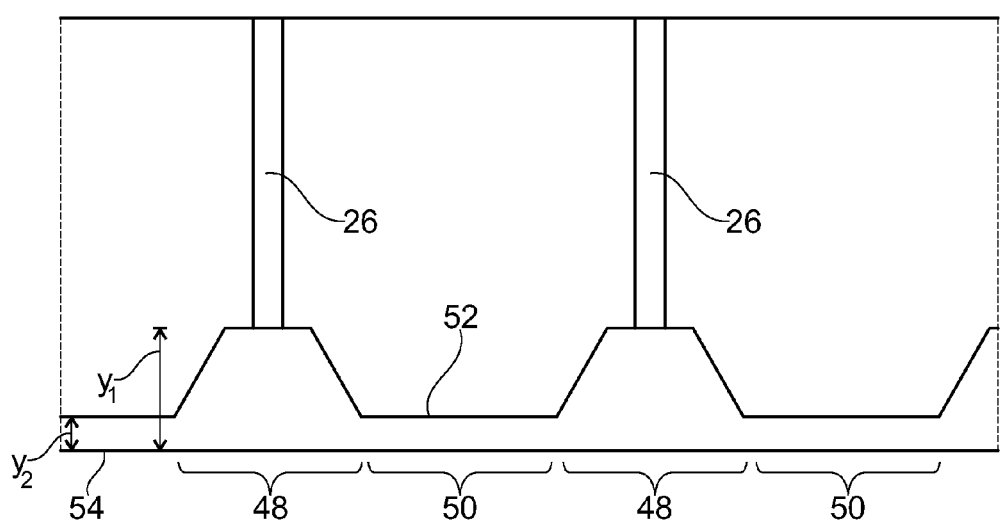
FIG. 2 shows a view of a portion of the impeller along A-A of FIG. 1.

FIG. 2 shows a view of a portion of impeller 12 along A-A in FIG. 1. As shown in FIG. 1, impeller shell 18 has been thinned at fluid flow receiving portions 50 between portions 48 supporting impeller blades 26. In one preferred embodiment, this thinning is accomplished by embossing or coining impeller shell 18 from an inside surface 52 thereof to increase the flow area of impeller 12 by increasing the volume of fluid flow receiving portions 50. By embossing or coining impeller shell 18 in such a manner, the thickness of impeller shell 18 at portions 50 is decreased from a first or initial thickness $Y_1$, which is a thickness of blade supporting or unthinned portions 48, to a second thickness $Y_2$ less than $Y_1$. In other embodiments, as portions 50 are thinned, portions 48 may be thickened by the displacement of material from thinned portions 50 and may have a thickness greater than the initial thickness of portions 48 after the thinning of portions 50. At inner surface 52, fluid flow portions 50 extend outward past blade supporting portions 48. Such thinning of impeller shell 18 at portions 50 thus increases the radial and axial flow area of impeller 18 without increasing the dimensions of outer surface 54 of impeller 12. Maintaining the thickness at the blade receiving portions 48 maintains the strength and stability of the portions of impeller shell 18 that connect to impeller blades 26.

Figure 3:
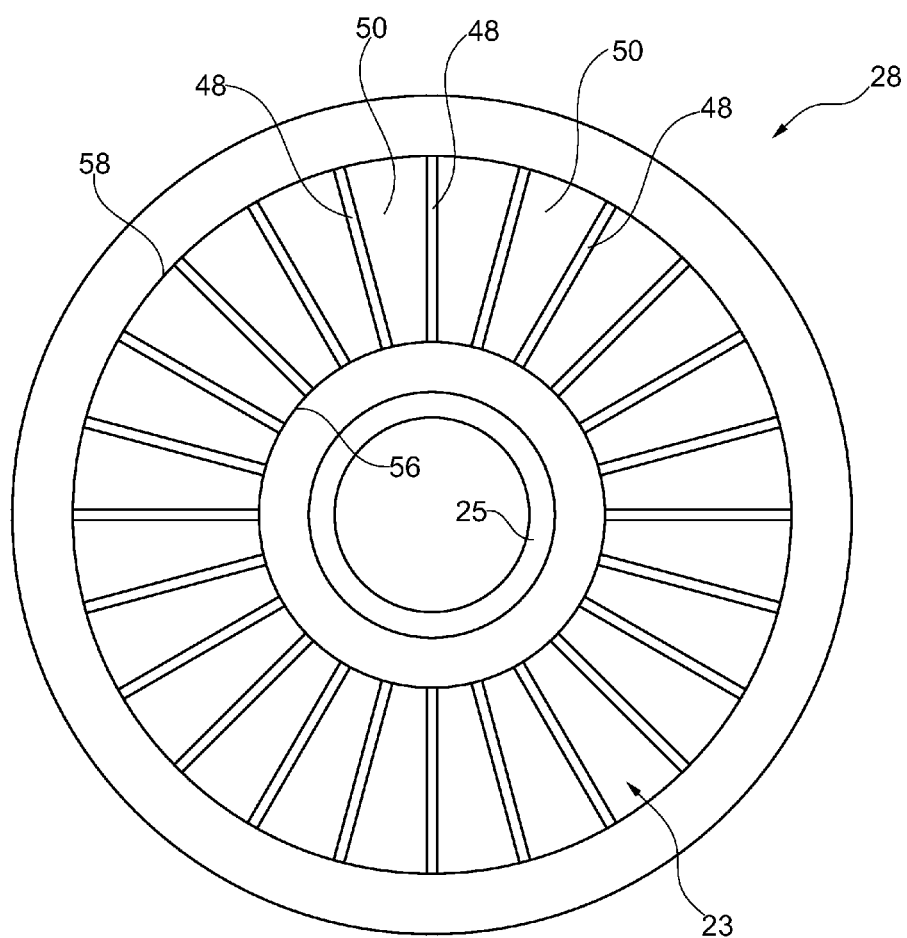
FIG. 3 shows a plan view of the impeller shell.

FIG. 3 shows a plan view of impeller shell 28. As shown in FIG. 3, unthinned blade receiving portions 48 and thinned portions 50 alternate with each other in the circumferential direction about a center of impeller shell 28. Rounded blade receiving portion 23 is shaped as a ring with unthinned blade receiving portions 48 and thinned portions 50 all extending radially from an inner circumference 56 of rounded blade receiving portion 23 to an outer circumference 58 of rounded blade receiving portion 23. Accordingly, each unthinned blade receiving portion 48 is formed as a strip and each thinned portion 50 is formed as a strip, with strips of thinned portions 50 being wider than the strips of unthinned blade receiving portions 48. Although unthinned blade receiving portions 48 are shown in FIG. 3 as being substantially linear, it should be understood that portions 48 may be curved between inner circumference 56 and outer circumference 58 when viewed from a plan view as in FIG. 3 and blade receiving portions 48 are shaped based on the shape of the impeller blades being received by the impeller shell. Radial extension 25 of impeller shell 18 is also not thinned such that the durability of radial extension 25 is not compromised and such that radial extension 25 is thicker than thinned portions 50.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. An impeller for a motor vehicle torque converter comprising:
   an impeller shell including blade supporting portions and fluid flow receiving portions between the blade supporting portions, the blade supporting portions being thicker than the fluid flow receiving portions; and
   a plurality of impeller blades, each of the impeller blades being connected to one of the blade supporting portions at an inner surface of the impeller shell.

2. The impeller as recited in claim 1 wherein the impeller shell includes a rounded blade receiving portion and a radial extension extending radial inward from the rounded portion, the blade supporting portions and fluid flow receiving portions being included in the rounded blade receiving portion.

3. The impeller as recited in claim 2 wherein the radial extension is thicker that the fluid flow receiving portions.

4. The impeller as recited in claim 1 wherein the rounded blade receiving portion is a ring including an inner circumference and an outer circumference, each of the blade supporting portions extending from the inner circumference to the outer circumference.

5. The impeller as recited in claim 1 wherein the fluid flow receiving portions are formed by embossing the inner surface of the impeller shell outwardly.

6. The impeller as recited in claim 1 wherein inner surfaces of the fluid flow portions extend outward past inner surfaces of the blade supporting portions.

7. The impeller as recited in claim 1 wherein the fluid flow receiving portions and the blade supporting portions are formed as strips alternating in the circumferential direction about a center of the impeller shell.

8. A torque converter comprising the impeller as recited in claim 1.

9. A method of forming an impeller for a motor vehicle torque converter comprising:
   thinning a plurality of sections of a rounded blade receiving portion of an impeller shell so as to leave a plurality of unthinned sections between the thinned sections; and
   attaching impeller blades to the unthinned sections.

10. The method as recited in claim 9 wherein the thinning includes embossing the rounded portion of the impeller shell outwardly, the impeller blades being attached to the inner surface of the impeller shell.

11. The method as recited in claim 9 wherein the rounded blade receiving portion is a ring including an inner circumference and an outer circumference, the thinning step being performed such that each of the thinned sections extend from the inner circumference to the outer circumference.

12. The method as recited in claim 9 wherein inner surfaces of the thinned sections extend outward past inner surfaces of the unthinned sections.

13. The method as recited in claim 9 wherein the thinned sections and the unthinned sections are formed as strips alternating in the circumferential direction about a center of the impeller shell.

* * * * *